United States Patent Office 3,429,919
Patented Feb. 25, 1969

3,429,919
O-(2-GUANIDINO-ETHYL)-OXIMES AND THE SALTS THEREOF
Harmannus Koopman, Van Houtenlaan, Weesp, Netherlands, assignor to North American Philips Company, Inc., New York, N.Y., a corporation of Delaware
No Drawing. Filed Mar. 8, 1966, Ser. No. 532,575
Claims priority, application Netherlands, Mar. 10, 1965, 6503019
U.S. Cl. 260—564
Int. Cl. C07c *129/12, 131/02;* A61k *27/00*
14 Claims

ABSTRACT OF THE DISCLOSURE (2-guanidino-ethyl)-oximes of the formula

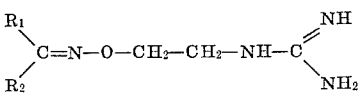

Examples are O-(2-guanidino-ethyl)-cyclohexanonoxime and O-(2-guanidino-ethyl)-phenoxyacetone-oxime-nitrate. The compounds have blood pressure reducing activities.

---

The invention relates to novel O-(2-guanidino-ethyl)-oximes and pharmaceutically acceptable acid addition salts thereof, to a method of producing these compounds, to pharmaceutical preparations containing at least one of these novel compounds as an active constituent and to a method of producing these preparations.

The novel compounds according to the invention have the Formula I:

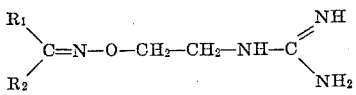

wherein $R_1$ and $R_2$ are a hydrogen atom, an alkyl-, aryl-, aryloxyalkyl- or aralkyl group, which may be alkyl-, alkoxy- or halogen-substituted and contains 1 to 12 carbon atoms, or, together an alicyclic group having 4 to 14 carbon atoms, which may be unsaturated, alkyl- or aryl-substituted, and condensed with one or two alicyclic or aromatic rings.

Pharmaceutically acceptable acids for the formation of suitable addition compounds with the compounds according to the invention may be: hydrochloric acid, nitric acid, sulphuric acid, phosphoric acid, sulphaminic acid, acetic acid, tartaric acid, citric acid, ascorbic, acid, benzoic acid, p-amino-benzoic acid, mandelic acid and salicylic acid.

Examples of the compounds according to the invention are the following compounds and salts thereof with, inter alia the said acids:

O-(2-guanidino-ethyl)-cyclohexanonoxime,
O-(2-guanidino-ethyl)-3,3,5-trimethylcyclohexene-5-onoxime,
O-(2-guanidino-ethyl)-cyclopentanonoxime,
O-(2-guanidino-ethyl)-cycloheptanonoxime,
O-(2-guanidino-ethyl)-cyclooctanonoxime,
O-(2-guanidino-ethyl)-n-caproaldehyde-oxime nitrate,
O-(2-guanidino-ethyl)-isovaleraldehyde-oxime nitrate,
O-(2-guanidino-ethyl)-anisaldehyde-oxime hydrochloride,
O-(2-guanidino-ethyl)-3-phenylpropionaldehyde-oxime benzoate,
O-(2-guanidino-ethyl)-butyrophenone-oxime hydrochloride,
O-(2-guanidino-ethyl)-4-chloroacetophenone-oxime hydrochloride,
O-(2-guanidino-ethyl)-phenoxyacetaldehyde-oxime nitrate,
O-(2-guanidino-ethyl)-4-methoxyphenoxybutyraldehyde-oxime nitrate,
O-(2-guanidino-ethyl)-phenoxyacetone-oxime nitrate,
O-(2-guanidino-ethyl)-4-phenoxybutanon-2-oxime hydrochloride,
O-(2-guanidino-ethyl)-2-phenoxyacetophenon-oxime hydrochloride,
O-(2-guanidino-ethyl)-2-(2-methoxyphenoxy)acetophenon-oxime hydrochloride,
O-(2-guanidino-ethyl)-1,3-diphenoxyaceton-oxiime hydrochloride,
O-(2-guanidino-ethyl)-1,3-bis(4-methylphenoxy)aceton-oxime hydrochloride,
O-(2-guanidino-ethyl)-4-phenylbutanon-2-oxime nitrate,
O-(2-guanidino-ethyl)-4-(4-methylphenyl)butanon-2-oxime nitrate,
O-(2-guanidino-ethyl)-3-phenylpropiophenon-oxime hydrochloride,
O-(2-guanidino-ethyl)-4'-methoxy-3-phenylpropiophenon-oxime hydrochloride,
O-(2-guanidino-ethyl)-4-chlorobenzophenon-oxime hydrochloride,
O-(2-guanidino-ethyl)-1-phenoxy-4-phenylbutanon-2-oxime hydrochloride,
O-(2-guanidino-ethyl)-1-phenoxy-4-(4-methoxyphenyl)butanon-2-oxime hydrochloride,
O-(2-guanidino-ethyl)-1,5-diphenylpentanon-3-oxime hydrochloride,
O-(2-guanidino-ethyl)-1,5-bis(3-methylphenyl)pentanon-3-oxime hydrochloride,
O-(2-guanidino-ethyl)-tetralon(1)-oxime hydrochloride,
O-(2-guanidino-ethyl)-4-methyl-cyclohexanonoxime,
O-(2-guainidino-ethyl)-phenoxyacetonoxime,
O-(2-guanidino-ethyl)-fluorenonoxime,
O-(2-guanidino-ethyl)-2,4-dimethylpentanon-3-oxime,
O-(2-guanidino-ethyl)-2,6-dichlorobenzaldoxime,
O-(2-guanidino-ethyl)-oxime of camphor.

It was found that the compounds according to the invention had an interesting blood-pressure reducing activity, probably based on a blocking of the sympathious. This activity was assessed inter alia in tests in which anaesthetized dogs and cats were intravenously injected with an isotonic solution of a compound according to the invention in water.

Especially O-(2-guanidino-ethyl) - cyclohexyloxime, O - (2-guanidino-ethyl) - cyclopentyloxime, O - (2-guanidino-ethyl) - cycloheptyloxime, O - (2-guanidino-ethyl)-cyclooctyloxime and O - (2-guanidino-ethyl)-1-indanonoxime appeared to be very active in the test.

As compared wth known blood-pressure reducing guanidine derivatives, such as the known guanethidine of the Formula II:

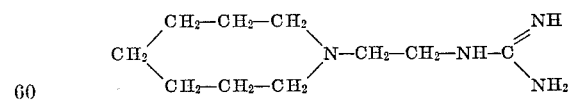

the compounds according to the invention have the advantage that after the administration only a very short period of increase in blood-pressure precedes the reduction of blood-pressure. A further advantage is the complete or substantially complete absence of diarrhea.

These properties render the compounds particularly suitable for use in pharmaceutical preparations for the treatment of hypertension.

The dose wherein the compounds should be given to patients may vary between broad limits but generally lies between about 10 to about 250 mgs. daily.

The compounds according to the invention may be produced by methods known for the production of this type of compounds or by analogous methods.

Particularly those methods are impartant in which the amino-group of a compound of the Formula III:

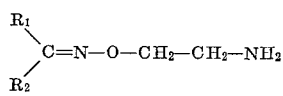

wherein $R_1$ and $R_2$ have the same meaning as in Formula I, or a salt thereof is converted into a guanidino group.

The amine is reacted, for example, with cyano-amide or with a reactive derivative thereof of the Formula IV:

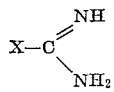

in which Formula X designates a radical easily replaced by an amino-group. Mention may be made of an alkoxy-group, a thioalkoxy-group, for example a methoxy-, ethoxy-, methylthio- and ethylthio-group or a $HO_2S$-group. Furthermore: heterocyclic groups having at least two nitrogen atoms in the ring, one of which is bound to the carbon atom of the amidinic group, for example a pyrazolyl-, amidazolyl-, triazolyl- or tetrazolyl-group, which may be substituted with lower alkyl-groups.

Satisfactory results are obtained, for example by using reactive cyano-amide derivatives of the Formula IV, in which X is a dialkyl-pyrazolyl-radical of the Formula V:

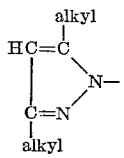

The alkyl-groups substituted in the pyrazol-ring are preferably alkyl-groups having 1 to 4 carbon atoms. For example, an amine of the Formula V is reacted with an acid-addition salt, for example the hydrochloric acid salt, sulphuric acid salt, nitric acid salt, phosphoric acid salt of a compound of the Formula VI:

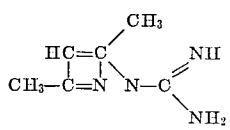

wherein the acid-addition salt of the guanidine of the Formula I is formed whilst 3,5-dimethylpyrazol is separated out. The reaction is preferably carried out in a solvent, for example water and alcohol, for example ethanol or methanol, dimethylformamide or mixtures thereof or of other solvents inert to the reaction.

It has been found that a satisfactory yield of the compounds according to the invention can be obtained by reacting an amine of the Formula III or a salt thereof with cyanamide. A salt of the amine with a strong acid, for example hydrochloric acid, nitric acid, sulphuric acid or picric acid are preferred. The reaction may be carried out without using a solvent by heating the reaction agent together to the melting point, but it is preferred to employ a solvent. Suitable solvents are for example: water, alcohols, for example methanol or ethanol, chlorobenzene or dimethylformamide or mixtures of such solvents. If a solvent is used, the reaction usually takes place at a temperature lying between 20° C. and 200° C., preferably at the boiling temperature of the reaction mixture.

As an alternative, the reaction may be carried out so that the cyan-amide is first formed in the reaction medium for example by the reaction of calcium nitrate ($CaCN_2$) with the solvent.

It is preferred to use a large excess quantity (2 to 10-fold) of cyan-amide, since during the reaction part of the cyan-amide may be withdrawn from the reaction, there being formed dicyano-diamide in side reaction.

After the addition of the cyano-amide to the salt of the amine of the Formula V, a salt of the oxime of the Formula I is directly obtained, which may be separated from the reaction mixture by classical methods. By known methods other salts or the free base may be formed from this salt. Other salts may be obtained for example by dissolving the salt in an aqueous solution of a salt, the anion of which forms a salt of the guanidine soluble with greater difficulty. The free base may be formed by converting a solution of the salt of the guanidine through a base ion exchanger into the form of a hydroxyl.

The compound of the Formula III, which is the starting material in this method, may be obtained from the oxime of the Formula VII:

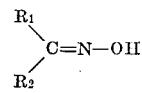

wherein $R_1$ and $R_2$ have the same meaning as in Formula I, by reacting the substance with aziridine,

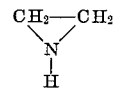

or with 2-halogeno- or 2-tosyloxy-ethylamine. If a 2-halogeno-compound for example 2-chloro-ethylamine is used good results are obtained by reacting the substance with, for example, the sodium salt of an oxime of the Formula VII. The reaction may be carried out in a solvent, for example ethanol, preferably at room temperature.

A further method of producing the compounds according to the invention consists in that an oxime of the Formula VII or a salt thereof with a cation, for example the sodium salt is reacted, preferably in a solvent, with an ethyl guanidine of the Formula VIII:

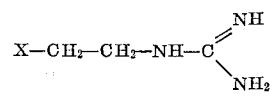

wherein X is a halogen atom, for example a chlorine atom or a reactive ester group, for example a tosyloxy-group or with a salt thereof. If the oxime itself a reacted, there is preferably added an acid binder.

The starting material of the Formula VIII may be produced by known methods, for example by reacting a compound of the Formula IX:

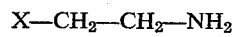

or a salt thereof, in which X has the same meaning as in Formula VIII, with, for example, cyan-amide.

A further method of producing the compounds according to the invention consists in that a compound of the Formula X:

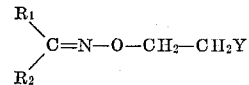

wherein Y is a halogen atom, for example a chlorine or iodine atom or a tosyloxy-group is reacted with guanidine. The reaction is preferably carried out in the presence of an alcoholate, for example potassium t-butylate, dissolved in t-butanol.

The starting material in this method, a compound of the Formula X, may be obtained in a conventional manner, for example, by reacting the corresponding oxime of the Formula VII or, preferably a salt thereof, for example the sodium salt, with 1,2-dibromoethane or 2-tosyloxy-ethylbromide. This reaction yields particularly satisfactory results in a suitable solvent, for example boiling ethanol.

Reference may furthermore be made to a possible method in which an aldehyde or a ketone of the Formula XI,

wherein $R_1$ and $R_2$ have the same meaning as in Formula I is reacted with O-(2-guanidino-ethyl)-hydroxylamine. The reaction is preferably carried out in a solvent.

According to the invention the novel compounds of the Formula I and their salts are processed by known methods to obtain therapeutically suitable forms. Thus novel pharmaceutical preparations are obtained, which are characterized by a content of at least one of the novel compounds according to the invention in a concentration of 1 to 1500 mgs. per unit of dosis.

Examples of these pharmaceutical preparations are injection liquids, potions, powders, pills, suppositories, tablets and dragées.

These preparations may be produced by using the classical pharmaceutical techniques and materials. For example, injection liquids are obtained by means of aqueous solutions of salts of the novel guanidines in a concentration of 1 to 50 mgs./ml., rendered isotonic to blood with the aid of sodium chloride. As an alternative mixtures of water and alcohols, for example, glycerol or benzylalcohol may be used as liquid diluents.

Solid pharmaceutical forms are produced in a conventional manner by mixing the active substance in solid pharmaceutical carrier materials such as lactic sugar, powder sugar, potato starch, calcium, magnesium stearate, arabic gum, gelatine, calcium phosphite and/or titanic dioxide, the mixture being worked up into tablets or dragées.

EXAMPLES (1a) O-(2-amino-ethyl)-cyclohexanon-oxime, hydrochloride

To a solution of sodium ethoxide in absolute ethanol, obtained from 5.15 gs. (0.224 mol) of sodium and 120 mls. of absolute ethanol, was added 11.30 gs. (0.100 mol) of cyclohexanon-oxime. The solution was heated to boiling point and within one and a half hours a solution of 13.00 gs. (0.112 mol) of 2-chloroethylamine-hydrochloride in 50 mls. of ethanol was added in drops. After a further hour of boiling the solution was cooled and filtered from the precipitated sodium chloride (12.98 gs.=99%).

To the filtrate was added 38 mls. of 2.85 N (0.108 mol) of alcoholic hydrochloric acid, after which the solution was inspissated in vacuo at 40° C. to a weight of 65 gs. After the precipitated sodium chloride had been filtered off, inspissation was continued to 22 gs.

The residue was then shaken twice with 50 mls. of ether in order to remove the cyclohexanonoxime. The residue was dissolved in 1 ml. of warm methanol, cooled, kept in the refrigerator for one and a half hours and filtered through a glass filter. The residue was 5.92 gs. of solid substance. After two crystallisations from a methanol-ether mixture, 2.26 gs. of the substance was obtained, which had a melting point of 156 to 165° C.

(1b) O-(2-guanidino-ethyl)-cyclohexanon-oxime-hydronitrate 1.92 gs. (0.010 mol) of O-(2-amino-ethyl)-cyclohexanonoxime. hydrochloride was dissolved in 20 mls. of absolute ethanol and 5 gs. (0.12 mol) of cyan-amide was added. After one night of boiling in a reflux cooler the precipitated dicyano-diamide was filtered off. The resultant guanidine was precipitated as an oil from the filtrate. The oil was dissolved in 9 mls. of water. After the addition of 9.0 gs. of ammonium nitrate, the O-(2-guanidino-ethyl)-cyclohexanone-oxime crystallized out as a nitrate. This product was filtered off and washed with a small supply of water. After one crystallisation from ethanol, 1.47 gs. having a melting point of 152–153° C. was obtained.

(2a) O-(2-amino-ethyl)-fluorenonoxime.hydrochloride

To a solution of 8.3 gs. of sodium in 120 mls. of absolute ethanol there were added, whilst stirring, in order of succession 17.6 gs. of fluorenonoxime and 37 gs. of β-bromo-ethylamine-hydrobromide. Then the mixture was stirred at room temperature for three hours. The resultant sodium bromide was filtered off and washed with ethanol and ether, the filtrate and the washing liquids being subsequently inspissated in vacuo to 32 gs. After the addition of 40 mls. of water, extracts were made three times from 50 mls. of ether. After drying on $Na_2SO_4$ the collected ether extracts had added to them 50 mls. of 2N methanolic hydrochloric acid solution. The resultant, crystallized hydrochloride was filtered off, washed with absolute ether and dried in air. Yield 17.9 gs., melting point 183–185° C. (decomposition).

(2b) O-(2-guanidino-ethyl)-fluorenonoxime.hydronitrate 2.75 gs. of the hydrochloride obtained as described in (2a) was boiled with 5 gs. of cyan-amide in 15 mls. of absolute ethanol for 18.5 hours. 75 mls. of absolute ether was added to the cooled reaction mixture. Dilution of the filtrate with 250 mls. of absolute ether provided an oily precipitation of the guanidine.hydrochloride. After the ether had been decanted, it was dissolved in 20 mls. of water and 18 gs. of ammonium-nitrate was added to the solution. After one night at room temperature the resultant precipitate was filtered off, washed with water and dried in air. Yield 2.26 gs. Recrystallisation from a mixture of 7.5 mls. of absolute ethanol and 10 mls. of absolute ether yielded 1.3 gs. of the nitrate; melting point 77–79° C. (decomposition).

(3a) O-(2-amino-ethyl)-2,4-dimethylpentanone-3-oxime.hydrochloride

To a solution of 9.7 gs. of sodium in 125 mls. of absolute ethanol was added, whilst stirring, 13.6 gs. of 2,4-dimethylpentanone-3-oxime and 43.3 gs. of β-bromo-ethylamine-hydrobromide. After stirring at room temperature for three hours the sodium bromide obtained was filtered off and washed with absolute ethanol and absolute ether. The filtrate and the combined washing liquids were inspissated in vacuo to 22.5 gs. The residue was then stirred in order of succession with 100 mls. and 50 mls. of absolute ether. The liquid was decanted and received 60 mls. of 2 N hydrochloric acid solution in methanol. After the solvent had been removed in vacuo and 50 mls. of 2 N NaOH had been added, extractions were carried out twice with 50 mls. and once with 25 mls. of ether. After drying on $Na_2SO_4$, the ether extracts received 60 mls. of 2 N hydrochloric acid solution in methanol. The solvent was evaporated in vacuo and 50 mls. of petroleum-ether was added to the residue, so that the aforesaid hydrochloride crystallized out. After one night at 0° C. this crystallisate was filtered off, washed with petroleum-ether and dried in air. Yield 6.45 gs.; melting point 87–88° C.

(3b) O-(2-guanidino-ethyl)-2,4-dimethylpentanone-3-oxime.hydronitrate 2.1 gs. of the hydrochloride obtained as described under (3a) was boiled with 5 gs. of cyan-amide in 10 mls. of absolute ethanol for 17.5 hours. 25 mls. of absolute ether was added to the cooled reaction mixture and the crystallized dicyano-diamide was filtered off. By diluting the filtrate with 250 mls. of absolute ether the guanidine was precipitated from the solution. The residue was dissolved, after the ether had been decanted, in 7.5 mls. of water. By adding 7.5 gs. of ammonium nitrate to said solution, the aforesaid nitrate was crystallized out. After some time it was filtered off, washed with a small supply of water and dried in air. Yield 1.8 gs., melting point 145–148° C. After recrystallisation from a mixture of ethanol and ether, 1.36 gs. of the nitrate was obtained; melting point 156–158° C. (sintering at 150° C.).

(4a) O-(2-amino-ethyl)-cyclopentanonoxime. hydrochloride

To a stirred solution of 7.96 gs. of sodium in 125 mls. of absolute ethanol was added 8.57 gs. of cyclopentanonoxime. After the addition of 35.4 gs. of 2-bromo-ethyl-amine-hydrobromide the mixture was stirred at room temperature for three hours. The resultant sodium bromide was filtered off and washed with absolute ethanol. The collected ethanol filtrates were inspissated in vacuo to 24.5 gs. After dissolving the residue in 35 mls. of water, the solution was extracted three times from 50 mls. of ether. After drying on $Na_2SO_4$, 25 mls. of 2 N hydrochloric acid solution in methanol was added to the ether extracts. The resultant, crystallized hydrochloride was filtered off, washed with ether and dried in air. Yield 3.24 gs.; melting point 148–150° C. (sintering at 143° C.). After the solvent had been removed in vacuo and acetone had been added to the residue 600 mgs. of the hydrochloride was obtained from the mother liquor; melting point 148–150° C. (sintering at 145° C.).

(4b) O-(2-guanidino-ethyl)-cyclopentanonoxime. hydronitrate 1.78 gs. of the hydrochloride mentioned under (4a) was dissolved in 15 mls. of absolute ethanol. After the addition of 5 gs. of cyan-amide the solution was boiled for 18.5 hours. The cooled solution was inspissated in vacuo to 9 gs. By mixing this residue with 150 mls. of absolute ether the resultant guanidine hydrochloride was precipitated in the form of an oil. After the ether was decanted, the oil was dissolved in 9 mls. of water and 9 gs. of ammonium nitrate was then added to said solution. The crystallized nitrate was filtered off, washed with 1.5 mls. of water and dried in air. Yield 1.92 gs.; melting point 142–143° C.

Recrystallisation from 4 mls. of absolute ethanol yielded 1.80 gs. of the aforesaid nitrate; melting point 152–154° C. (sintering at 146° C.).

(5a) O-(2-amino-ethyl)-cyclooctanonoxime. hydrochloride

To a solution of 7.09 gs. of sodium in 100 mls. of absolute ethanol were added 10.9 gs. of cyclooctanonoxime and 31.6 gs. of 2-bromo-ethylamine.hydrobromide. The mixture was stirred at room temperature for three hours. After the sodium bromide was filtered off, the filtrate was freed from the alcohol in vacuo. The residue was extracted, after the addition of 35 mls. of water, three times from 50 mls. of 27 mls. of 2 N hydrochloric acid solution in methanol was added to the extracts dried on $Na_2SO_4$. After the removal of the solvent in vacuo the residue was mixed with 150 mls. of petroleum-ether (boiling point 40–60° C.), so that the reaction produce crystallized out. It was filtered off, washed with a small quantity of petroleum-ether.

(5b) O-(2-guanidino-ethyl)-cyclooctanonoxide. hydronitrate 2.2 gs. of the hydrochloride obtained as described under (5a) was boiled in a solution with 12.5 mls. of absolute ethanol, with 5 gs. of cyan-amide for 18 hours. After cooling 100 mls. of absolute ether was added to the reaction liquid and a small quantity of solid substance was filtered off. The filtrate was diluted with 200 mls. of absolute ether. After the ether was decanted, the residue was dissolved in 12.5 mls. of water and 12.5 gs. of ammonium nitrate was added thereto, the nitrate of the aforesaid guanidine crystallized out. After some time it was filtered off, washed with a small supply of water and dried in air. Yield 1.61 gs.; melting point 145° C. (decomposition). Crystallisation from 3 mls. of ethanol yielded 1.08 gs.; melting point 162.5–164.5° C.

(6a) O-(2-amino-ethyl)-oxime of camphor. hydrochloride

To a solution of 8.64 gs. of sodium in 120 mls. of absolute ethanol were added, whilst stirring, 15.35 gs. of camphor oxime and 37.7 gs. of 2-bromo-ethylamine-hydrobromide. After stirring at room temperature for 3.5 hours, the resultant sodium bromide was filtered off and washed with absolute ethanol. The collected ethanol filtrates were freed of ethanol in vacuo. The residue was dissolved in 40 mls. of water and extracted three times with 50 mls. of ether. 42.5 mls. of 2 N hydrochloric acid solution in methanol was added to the ether extracts dried on $Na_2SO_4$. After the solvent was removed in vacuo, 500 mls. of absolute ether was added to the residue. The crystallized hydrochloride was filtered off, washed with ether and dried in air. Yield 13 gs.; melting point 174–176° C. (sintering at 157° C.). After recrystallisation from 300 mls. of methylethylketone 8.9 gs. of the above hydrochloride was obtained; melting point 188–190° C. (sintering at 185° C.).

(6b) O-(2-guanidino-ethyl)-camphor oxime. hydronitrate 247 gs. of the hydrochloride obtained as described under (6a) was dissolved in 12.5 mls. of absolute ethanol and 5 gs. of cyanamide was added to said solution. The mixture was boiled for 18.5 hours. After cooling to room temperature a small quantity of solid substance was filtered off and 150 mls. of absolute ether was added to the filtrate. The crystallized dicyanodiamide was filtered off and the filtrate was diluted with 100 mls. of absolute ether. The crystallized hydrochloride was filtered off, washed with absolute ether and dried in air. Yield 2.30 gs. of hydrochloride; melting point 130–132° C.

1.5 gs. of the hydrochloride was dissolved in 8 mls. of water, and 8 gs. of ammonium nitrate was added thereto. The crystallized nitrate was filtered off after some time, washed with a small supply of water and dried in air. Yield 1.54 gs.; melting point 176–178° C. (decomposition). Recrystallisation from 3 mls. of ethanol yielded 1.08 gs. of said nitrate; melting point 179–181° C. (decomposition).

(7a) O-(2-amino-ethyl)-benzophenonoxime. hydrochloride

To a stirred solution of 9.52 gs. of sodium in 145 mls. of absolute ethanol were added, in order of succession, 20.4 gs. of benzophenonoxime and 42.4 gs. of 2-bromo-ethylamine.hydrobromide. After stirring at room temperature for 3 hours, the resultant sodium bromide was filtered off and washed with absolute ethanol and absolute ether. The filtrate and the washing liquids were evaporated to dryness in vacuo and the residue was then stirred in order of succession with 100 mls. and 50 mls. of absolute ether. After the addition of 75 mls. of 2 N hydrochloric acid solution in methanol to the ether extracts the solvent was removed in vacuo. The addition of 200 mls. of absolute ether caused the hydrochloride to crystallize out. The crystallisate was filtered off, washed with ether and dried in air. Yield 21.8 gs.; melting point 165–170° C. Recrystallisation from 85 mls. of absolute alcohol and 25 mls. of absolute ether yielded 14.5 gs. of O - (2-amino - ethyl)-benzophenonoxime.hydrochloride; melting point 182.5–184° C.

(7b) O-(2-guanidino-ethyl)-benzophenonoxime hydrochloride 2.77 gs. of the hydrochloride obtained as described under (7a) was boiled with 5 gs. of cyan-amide in 15 mls. of absolute alcohol for 19 hours. After the addition of 100 mls. of absolute ether a small quantity of precipitate was filtered off. The filtrate was diluted with 300 mls. of absolute ether and the crystallized hydrochloride was filtered off after having been kept at 0° C. for some hours and washed with absolute ether. Yield 2.85 gs.; melting point 156–158° C. After two recrystallisations from a mixture of ethanol and ether, 1.42 gs. of said hydrochloride was obtained; melting point 172.5–173.5° C.

(8a) O-(2-aminoethyl)-4-methylcyclohexanone-oxime-hydrochloride

To a solution of 12.84 gs. of sodium in 150 mls. of absolute ethanol was added 17.8 gs. of 4-methyl-cyclohexanone-oxime and 57.3 gs. of 2-bromoethylamine-hydrobromide. After stirring for three hours at room temperature the ethanol was removed from the reaction mixture in vacuo. The resultant residue, after the addition of 75 mls. of water, was extracted from, in total, 300 mls. of ether. To the collected, dried ether extracts was added 32 mls. of 4.2 N ethanolic hydrochloric acid solution. By removing the solvent in vacuo and adding 200 mls. of absolute ether to the resultant residue the aforesaid hydrochloride crystallized out. To the impure hydrochloride, dissolved in 25 mls. of water, was added 75 mls. of 2 N NaOH, after which the mixture was extracted three times with 50 mls. of ether. After the addition of 11 mls. of 4.2 N ethanolic hydrochloric acid solution, the solvent was removed in vacuo from the ether extracts dried on $Na_2SO_4$. By the addition of ether to the residue the hydrochloride crystallized again out. It was further purified by recrystallization from a mixture of absolute ethanol and absolute ether. Yield 5.28 gs. Melting point 133.5–135° C.

(8a) O-(2-guanidinoethyl)-4-methylcyclohexanone-oxime-hydronitrate 2.6 gs. of the hydrochloride obtained as described under (8a) was dissolved with 5 gs. of cyanamide in 12.5 mls. of absolute ethanol and boiled for 16 hours. After cooling the crystallized dicycanodiamide was filtered off and washed with absolute ethanol and absolute ether. By a dilution of the filtrate with 500 mls. of absolute ether the impure guanidino-hydrochloride was precipitated in the form of an oil. After a few hours at room temperature the ether was decanted and the residue was dissolved in 12.5 mls. water. By adding 12.5 gs. of ammonium nitrate to said solution the said nitrate crystallized out. It was filtered off after some time and washed with a small supply of water and dried in air. Yield 2.83 gs. of the desired substance. Melting point 112–114° C. Recrystallization from 3.5 mls. of absolute ethanol yielded 1.1 gs. of nitrate; melting point 117.5–118° C. (sintering at 115.5° C.). By diluting the mother liquor with absolute ether 1.12 gs. of nitrate was furthermore obtained; melting point 115.5–117° C.

(9a) O-(2-aminoethyl)-cycloheptanone-oxime-hydrochloride

The synthesis of this substance was carried out in the manner described for the compound of Example 5a. After crystallization from acetone the yield was 20%. Melting point 120–123° C.

(9b) O-(2-guanidinoethyl)-cycloheptanone-oxime-nitrate

This substance was obtained with a yield of 83% in the manner described in Example 4a. Melting point 146.5–148° C.

(10a) O-(2-aminoethyl)-adamantanone-oxime-hydrochloride

To a stirred solution of 8.25 gs. of sodium in 125 mls. of absolute ethanol were added in order of succession 14.93 gs. of adamatanone-oxime and 36.8 gs. of 2-bromoethylamine-hydrobromide. After stirring at room temperature for three hours, the resultant sodiumbromide was filtered off and washed with ethanol and ether. The filtrate and the collected washing liquids were concentrated in vacuo to 35 gs. and to the concentrate was added 30 mls. of water. This dissolved concentrate was then extracted with a total 90 mls. of ether. After drying of the collected ether extracts with the aid of sodium sulphate, 21 mls. of 4 N ethanolic hydrochloric acid was added to said solution. The solution was concentrated in vacuo to 23 gs., and 45 mls. of 2 N caustic soda lye was added to this concentrate. The amine was again extracted with ether and 4 N ethanolic hydrochloric acid solution was added to the collected extracts dried on $Na_2SO_4$ until the pH value was 4. By evaporating this solution to dryness in vacuo and by adding a mixture of 30 mls. of acetone and 150 mls. of absolute ether the aforesaid hydrochloride crystallized out. After some time it was filtered off, washed with ether and dried in air. Yield 6.75 gs. and melting point 137–140° C. A recrystallization from a mixture of 25 mls. of butanone-2 and 30 mls. of ether yielded 4.93 gs.: melting point 162–164° C. (sintering at 156° C.).

(10b) O-(2guanidinoethyl)adamatanone-oxime

This guanidino-compound was obtained with a yield of 59% in the manner described in Example 7b. Melting point 196–197° C.

(11a) O-(2-aminoethyl)-1-indanone-oxime-hydrochloride

To a solution of 7.58 gs. of sodium in 125 mls. of absolute ethanol were added, in order of succession, whilst stirring, 12.1 gs. of 1-indanone-oxime and 33.8 gs. of 2-bromoethylamine-hydrobromide. After stirring at room temperature for three hours the resultant sodium bromide was filtered off and washed with absolute ethanol and absolute ether. The filtrate and the collected washing liquids were evaporated together in vacuo to 26 gs. The resultant residue, after the addition of 40 mls. of water, was extracted three times with 50 mls. of ether. To the collected ether extracts, after drying on $Na_2SO_4$, was added 40 mls. of 2 N methanolic hydrochloric acid solution, after which the hydrochloride crystallized. This was filtered off after some time, washed with absolute ether and dried in air. Yield 9.8 gs.; melting point 197–198° C. (decomposition). After recrystallization from a mixture of 150 mls. of absolute ethanol and 25 mls. of absolute ether 7.12 gs. of hydrochloride was obtained; melting point 200.5–201° C. (decomposition; sintering at 190° C.).

(11b) O-(2-guanidinoethyl)-1-indanone-oxime-hydrochloride 2.27 gs. of the hydrochloride referred to under *a* was boiled with 5 gs. of cyanamide in 20 mls. of absolute ethanol for 19 hours. After dilution of the mixture with 125 mls. of absolute ether a small quantity of precipitate was filtered off. After dilution with 250 mls. of absolute ether the hydrochloride crystallized out of the filtrate. After some hours it was filtered off at room temperature and washed with ether. After two recrystallizations from a mixture of ethanol and ether, 760 mgs. of the aforesaid hydrochloride was obtained; melting point 151.5–152.5° C.

(12a) O-(2-aminoethyl)-10,11-dihydro-dibenzo-(a,d)-cycloheptene-5-one-oxime-hydrochloride This substance was obtained in a manner described in Example 4a with a yield of 34%; melting point 242–243° C.

(12b) O-(2-guanidinoethyl)-10,11-dihydro-dibenzo-(a,d)-cychoheptene-5-one-oxime-nitrate In the manner described in Example 4b this guanidino-derivative was obtained with a yield of 65%. Melting point 178–179° C.

(13a) O-(2-aminoethyl)-2,6-dichloro-benzaldehyde-syn. oxime-hydrochloride

To a stirred solution of 7.94 gs. of sodium in 100 mls. of absolute ethanol was added, in order of succession, 16.4 gs. of 2.6-dichlorobenzaldehyde-syn.-oxime and 35.4 gs. of 2-bromoethylamine-hydrobromide. After stirring at room temperature for 2.5 hours the resultant sodiumbromide was filtered off and washed with absolute ethanol and absolute ether. The filtrate and the washing liquids were evaporated in vacuo to 29.5 gs. and the residue was four times extracted from ether. The ether extracts were dried on sodium sulphate and 32 mls. of 2 N-methanolic hydrochloric acid solution was added, so that the hydrochloride of the aforesaid amine crystallized out. After some time this was filtered off, washed with ether and dried in air. Yield 8.9 gs.; melting point 92–94° C.

A few recrystallizations from a mixture of ethanol and ether yielded a rise of the melting point to 120–122° C. (sintering at about 100° C.). The hydrochloride contained about 6% of water.

(13b) O-(2-guanidino-ethyl)-2,6-dichlorobenzaldehyde-syn. oxime nitrate 1.42 gs. of the hydrochloric obtained as described in (13a) was boiled with 3.5 gs. of cyanamide in 10 mls. of absolute ethanol for 18.5 hours. After cooling the crystallized dicyanodiamide was filtered off and the filtrate was diluted with 150 mls. of absolute ether. The impure guanidino-hydrochloride was precipitated in the form of an oil from the solution. After decanting of the ether the residue was dissolved in 7.5 mls. of water. By adding 7.5 gs. of ammonium nitrate to this solution, the nitrate of the aforesaid guanidine crystallized out. After some time it was filtered off, washed with a small supply of water and dried in air. Yield 1.1 gs.; melting point 96–98° C. By recrystallization from a mixture of absolute ethanol and absolute ether, 720 mgs. of nitrate was obtained; melting point 102–104° C. From the mother liquor dilution with a further quantity of ether yielded again 0.31 g.; melting point 100–102° C.

What is claimed is:
1. A compound selected from the group consisting of a base of the formula

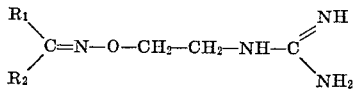

wherein $R_1$ and $R_2$ are each moieties selected from the group consisting of hydrogen, alkyl, alkoxyphenyl, phenyl, chlorophenyl, phenylalkyl, alkoxyphenoxy-alkyl, phenoxyalkyl, alkylphenylalkyl and alkoxyphenylalky of 1 to 12 carbon atoms and $R_1$ and $R_2$ togther with the carbon to which they are attached forming a member of the group consisting of tetralyl, fluorenyl, adamantanyl, cycloalkanone of 5 to 9 carbon atoms and 10,11-dihydrodibenzo (a,d) cycloheptenyl, at least one of $R_1$ and $R_2$ being other than hydrogen and the pharmaceutically acceptable acid addition salts thereof.

2. As a compound of claim 1 O-(2-guanidino-ethyl)-cyclohexanonoxime.hydronitrate.

3. As a compound of claim 1 O-(2-guanidino-ethyl)-fluorenonoxime-hydronitrate.

4. As a compound of claim 1 O-(2-guanidino-ethyl)-2,4-dimethylpentanone-3-oxime.hydronitrate.

5. As a compound of claim 1 O-(2-guanidino-ethyl)-cyclooctanonoxime.hydronitrate.

6. As a compound of claim 1 O-(2-guanidino-ethyl)-cyclopentanonoxime.hydronitrate.

7. As a compound of claim 1 O-(2-guanidino-ethyl)-camphor-oxime.hydronitrate.

8. As a compound of claim 1 O-(2-guanidino-ethyl)-benzophenonoxime.hydrochloride.

9. As a compound of claim 1 O-(2-guanidino-ethyl)-4-methyl-cyclohexanone oxime-hydronitrate.

10. As a compound of claim 1 O-(2-guanidino-ethyl)-cycloheptanone oxime-hydronitrate.

11. As a compound of claim 1 O-(2-guanidino-ethyl)-adamantaneone oxime.

12. As a compound of claim 1 O-(2-guanidino-ethyl)-1-indanone oxime-hydrochloride.

13. As a compound of claim 1 O-(2-guanidino-ethyl)-10,11 - dihydro-dibenzo-(a,d)-cycloheptene-5-one-oxime-hydronitrate.

14. As a compound of claim 1 O-(2-guanidino-ethyl)-2,6-dichlorobenzaldehyde-syn.oxime-hydronitrate.

References Cited
UNITED STATES PATENTS 3,270,054  8/1966  Gagneux et al. _____ 260—564

CHARLES B. PARKER, *Primary Examiner.*

R. V. HINES, *Assistant Examiner.*

U.S. Cl. X.R.

424—326; 260—239, 308, 310, 343.7, 453, 456, 501.11, 501.12, 501.14, 513.7, 551, 586, 588, 590, 591, 592, 593, 598, 599, 601

PO-1050
(5/69)

UNITED STATES PATENT OFFICE
CERTIFICATE OF CORRECTION

Patent No. 3,429,919     Dated February 25, 1969

Inventor(s)     HARMANNUS KOOPMAN

It is certified that error appears in the above-identified patent and that said Letters Patent are hereby corrected as shown below:

Column 6, line 53, "60 mls." should read -- 40 mls --; Column 7, line 51, after "of" (first occurrence) insert -- ether. --; Column 8, line 25, "247 gs." should read -- 2.47 gs --.

Signed and sealed this 3rd day of March 1970.

(SEAL)
Attest:

Edward M. Fletcher, Jr.
Attesting Officer

WILLIAM E. SCHUYLER, JR.
Commissioner of Patents